United States Patent [19]

Burkhead

[11] 3,966,599

[45] June 29, 1976

[54] METHOD AND APPARATUS

[75] Inventor: Carl E. Burkhead, Lawrence, Kans.

[73] Assignee: Ecodyne Corporation, Lenexa, Kans.

[22] Filed: Sept. 16, 1974

[21] Appl. No.: 506,211

Related U.S. Application Data

[63] Continuation-in-part of Ser. No. 202,489, Nov. 26, 1971, abandoned.

[52] U.S. Cl. ................................ 210/14; 210/151; 210/197; 210/17
[51] Int. Cl.[2] .......................................... C02C 1/04
[58] Field of Search ............................... 210/4–7, 210/14, 15, 17, 80, 49, 50, 150–152, 195, 197, 201, 274, 293; 261/77, 91

[56] References Cited
UNITED STATES PATENTS

| | | | |
|---|---|---|---|
| 2,355,640 | 8/1944 | Fischer et al. | 210/151 |
| 3,235,234 | 2/1966 | Beaudoin | 210/17 X |
| 3,371,033 | 2/1968 | Simmons et al. | 210/17 X |
| 3,428,177 | 2/1969 | Duff | 210/274 X |
| 3,709,364 | 1/1973 | Savage | 210/195 |
| 3,722,679 | 3/1973 | Logue | 261/77 X |
| R27,721 | 8/1973 | Klock | 210/17 X |

FOREIGN PATENTS OR APPLICATIONS

| | | | |
|---|---|---|---|
| 2,049,072 | 4/1971 | Germany | 210/150 |
| 610,751 | 10/1948 | United Kingdom | 210/17 |

Primary Examiner—Charles N. Hart
Assistant Examiner—Robert H. Spitzer
Attorney, Agent, or Firm—Hume, Clement, Brinks, Willian, Olds & Cook, Ltd.

[57] ABSTRACT

Methods and apparatus are disclosed for treating biodegradable waste products. A liquor of waste products is introduced into a reactor mixing zone comprising a column of fixed media material having a high surface area to volume ratio, a low resistance to liquid flow and a surface condition receptive to aerobic microbial growth. The liquor is circulated in a continuous flow path including the fixed media column. Preferably, a mechanical surface aerator is positioned in the continuous flow path immediately above the mixing zone to aerate the liquor and distribute it uniformly over the top of the fixed media column. The aeration, distribution and circulation of the liquor are accomplished in a manner to promote homogeneous mixing throughout the mixing zone and to encourage aerobic microbial growth on the fixed media while minimizing agitation of a nature tending to dislodge the aerobic microbial growth from the fixed media and develop flocculent aerobic microbes. A sediment receiving zone is provided immediately below an apertured floor of the mixing zone for collection of residual solids. Other method and apparatus features are disclosed.

15 Claims, 2 Drawing Figures

METHOD AND APPARATUS

REFERENCE TO RELATED APPLICATION

This is a continuation-in-part of my copending application Ser. No. 202,489, filed Nov. 26, 1971 now abandoned.

INTRODUCTION

The present invention relates generally to the treatment of biodegradable waste products and, more particularly, is directed to new and improved methods and apparatus utilizing aerobic microbial growth on fixed media for biological oxidation of waste products.

BACKGROUND OF THE INVENTION

A wide range of methods and apparatus are known to the art for processing biologically degradable waste products to provide a clarified and safe effluent for return to nature. The attention in recent years focused on deterioration of our ecology has placed high priority on the development of better waste treatment systems than those presently known to this already refined art.

Basically, biological sewage treatment is a process in which microorganisms metabolize waste products producing gaseous and soluble molecular end products, and additional bacterial cells. The rapidity and effectiveness of the process is aided by increasing the quantity of bacterial cells, or standing crop, available to carry out the metabolism. The concentrating and holding of the organisms in the system has in the prior art been obtained by one of several physical or biological techniques including flocculation, sedimentation and provision of large surface areas for bacterial multiplication.

Two widely known and conventional techniques for treating biodegradable waste products are the activated sludge and trickling filter processes. In an activated sludge system, contact of organisms with waste is brought about by mixing sewage with sludge, i.e., a concentrated solid containing flocs of organisms, to form the mixed liquor and then subjecting the mixture to strong agitation while introducing large volumes of air. In trickling filter systems, the biological organisms are not present in or submerged in an aqueous medium but are present in the form of exposed growth on the surface of suitable base objects in contact with the atmosphere and reaction is brought about by flowing the waste in relatively thin streams in direct contact with the biological slimes.

Combination or hybrid systems employing aspects of both the activated sludge and the trickling filter are also known to the art. An example of such a system is disclosed in U.S. Pat. No. 3,563,888. Another example is well-known Hays process which utilized vertically oriented flat asbestos cement plates as the contact surfaces for aerobic microbial growth. Air is blown under the plates through orifices in a base grid to provide the requisite oxygen.

A further and detailed discussion of the prior art processes including the Hays process as well as an extended discussion and analysis of a laboratory study of the method and system of the present invention are provided in a Master of Science thesis entitled "A Fixed Media Complete Mixing Activated Sludge System" by Murli Tolaney submitted to the Department of Civil Engineering and the Faculty of the Graduate School of the University of Kansas, May 1971.

SUMMARY OF THE INVENTION

An objective of the present invention is to provide new and improved methods and apparatus for treating biodegradable waste materials which are more economical than those of the prior art and which produce a higher quality effluent.

The method and system of the present invention in its preferred embodiment operates as an aeration tank, settling tank, and aerobic digester in a single physical unit. Thus, the settling tanks, sludge recycle pumps and operational problems associated with conventional activated sludge systems are obviated. Additionally, the system operates at a higher microbial intensity and has a higher capacity than conventional trickling filters.

In accordance with the method of the invention, a liquor comprised of biologically degradable waste products involve the steps of providing a mixing zone with a top and a bottom and including therebetween a fixed media of a type having a high surface area to volume ratio, a low resistance to liquid flow and a surface condition receptive to aerobic microbial growth. A separate flow passageway is also provided between the top and bottom of the mixing zone. The liquor is introduced into the mixing zone in a volume to submerge the fixed media and is continuously circulated in a flow path including the mixing zone and the flow passageway at a flow rate and under conditions for promoting thorough mixing of the liquor with the fixed media and for maintaining aerobic microbial growth fixed to the fixed media. The liquor is aerated in the flow path at a location outside of the mixing zone for minimizing turbulence within the mixing zone and for encouraging stable aerobic microbial growth on the fixed media within the mixing zone. A clarified effluent produced by the foregoing steps is drawn off at a suitable location in the flow path. Other method aspects of the invention are considered in greater detail later herein.

The apparatus of the present invention relates to a system comprising reactor means including a container having a mixing zone with a top and a bottom and having an inlet for introducing a liquor of biologically degradable waste products into the container in a quantity to submerge the mixing zone. An outlet is provided from the container for drawing off the clarified effluent. A fixed media means occupies the volume of the mixing zone and comprises a material having a high surface area to volume ratio, a low impedance to liquid flow and a surface condition receptive to aerobic microbial growth. A flow passageway means is provided between the top and the bottom of the mixing zone. There are additionally provided circulating means for pumping the liquor in a recirculation flow path from the top to the bottom of the mixing zone and return through the flow passageway means. The circulating means includes aerator and distributor means for aerating the liquor outside of the mixing zone and for distributing the aerated liquor uniformly over the top of the mixing zone. The circulating means is further constructed and arranged for providing homogeneous mixing of the aerated liquor throughout the mixing zone in a manner to encourage aerobic microbial growth on the fixed media while minimizing agitation in the mixing zone of a kind tending to dislodge aerobic microbial growth from the fixed media and develop flocculent aerobic microbes.

BRIEF DESCRIPTION OF THE DRAWINGS

The novel features of the present invention are set forth with particularity in the appended claims. The invention together with further objects and advantages thereof may best be understood, however, by reference to the following description taken in conjunction with the accompanying drawings in the several figures of which like reference numerals identify like elements and in which:

DESCRIPTION OF THE PREFERRED EMBODIMENTS

Figure 1:
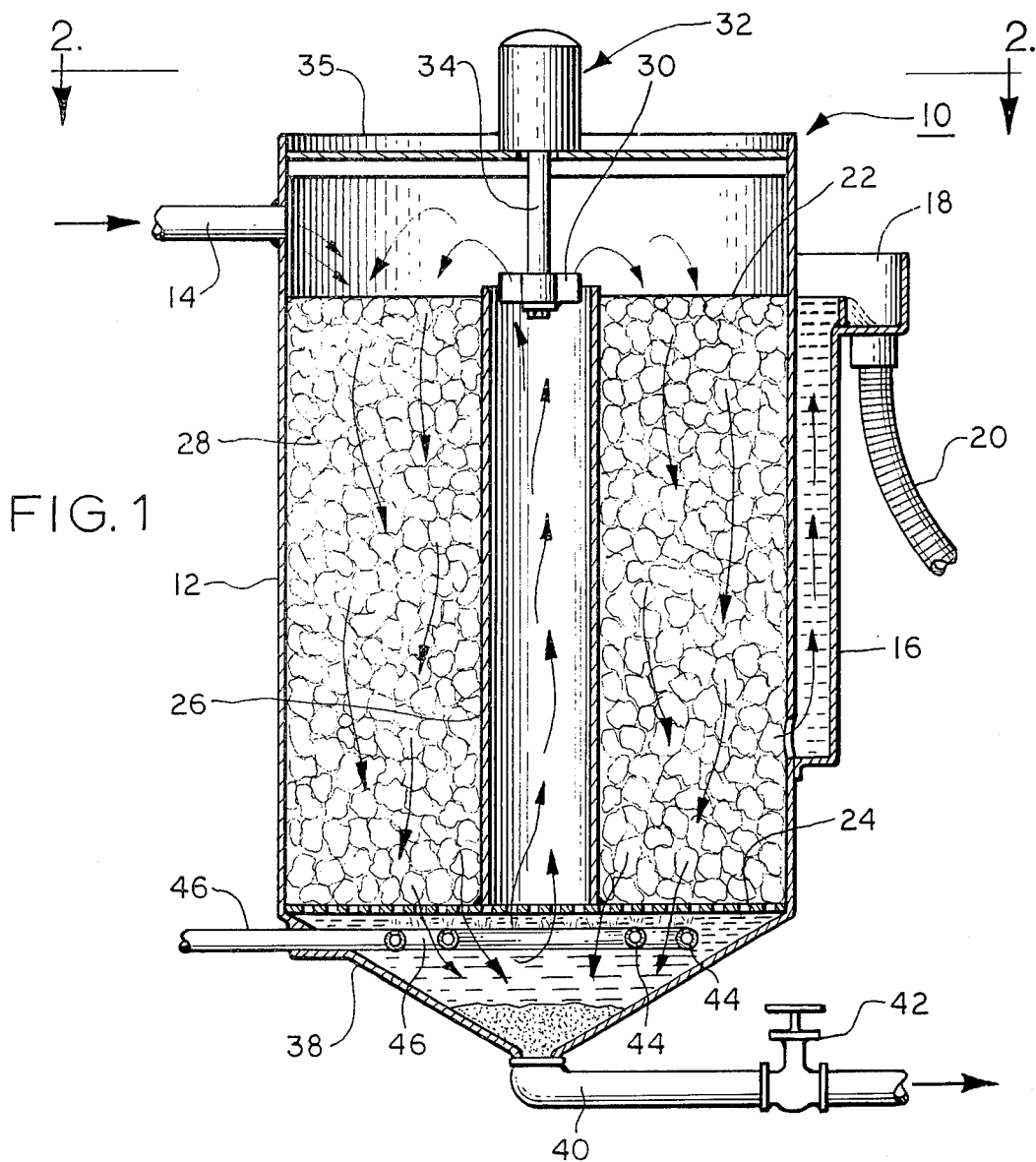
FIG. 1 is a semi-schematic representation, in cross-section, of a reactor system constructed in accordance with the teachings of the present invention.
Figure 2:
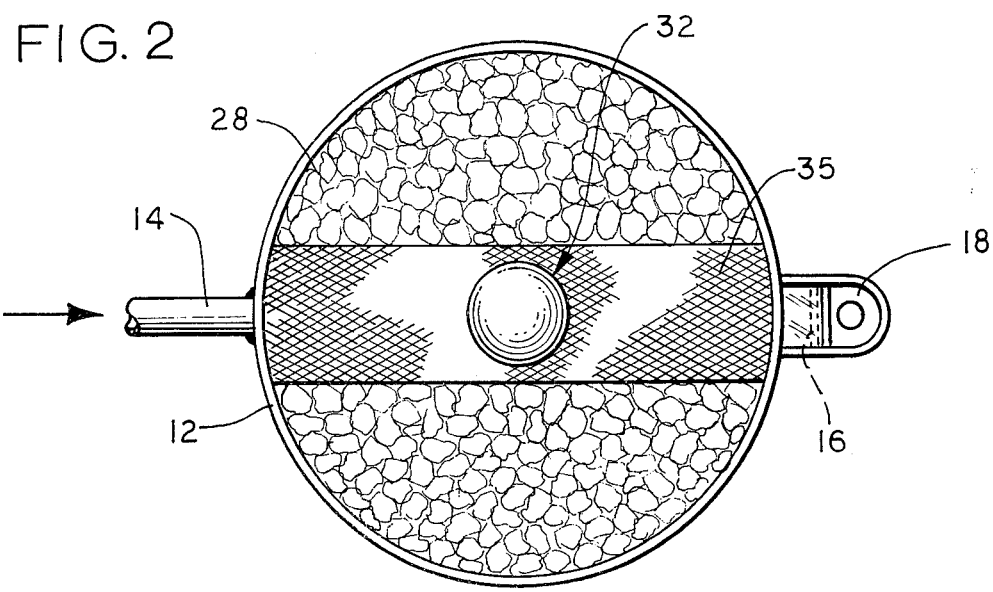
FIG. 2 is a top view of the system structure of FIG. 1.

Referring now to FIG. 1, the reactor system 10 there shown comprises an outer housing or reactor means 12 composed of metal plate or the like and having a corrosion-resistant internal surface. In the present embodiment, the housing 12 is of a cylindrical contour although those skilled in the art will recognize that a variety of other configurations may be utilized consistent with the present invention. An inlet conduit 14 opens into housing 12, and herein is located adjacent the upper end of the housing 12.

A liquor of biologically degradable waste products such as sewage and/or industrial waste is introduced into the reactor system 10 through the inlet 14. The waste products may be in a raw form or, alternatively, may previously have been subjected to some initial treatment such as gross screening, communition, grit removal and/or sedimentation.

The housing 12 also includes an outlet pipe or conduit 16 for drawing off the effluent that has been treated and clarified within the reactor 10. A conventional control weir and effluent box 18 follows the outlet conduit 16. The effluent passing weir 18 is of a pure and stable quality suitable for delivery to a stream or the earth through conduit 20.

The housing 12 includes a mixing zone having a top 22 positioned just below the inlet conduit 14 and having a bottom 24 positioned adjacent the base of the housing 12. The bottom 24 of the mixing zone is, in the present embodiment, defined by a perforated metal floor of the housing 12. The metal floor may be formed from conventional expanded metal grating or the like.

With the exception of a central flow passage 26, presently to be considered, the entire volume of the mixing zone between top 22 and bottom 24 is occupied by a single column of submerged fixed media material 28. The fixed media 28 may be composed of any of a wide range of materials having a high surface area to volume ratio, a low impedance to liquid flow, i.e., a high porosity and a surface condition receptive to aerobic microbial growth. Generally, the fixed media 28 should have a surface area to volume ratio of 20ft.$^2$ per cubic foot of volume, and a minimum volumetric void space of 85%. Lower surface area to volume ratios result in insufficient surface area to permit adequate microbial growth, and a lower percentage of void space results in clogging of the media. As a practical matter, for best results the preferred minimum surface area is 27ft.$^2$ per cubic foot of volume, and the preferred void volume is at least 90%. Void volume may be readily determined by immersing the media in water and noting the volume displaced. Thus, if 1000 cc of media is placed in one liter of water, 100 cc of water would be displaced.

By way of example, suitable fixed media 28 is a plastic tower packing media composed of polypropylene "Flexirings" manufactured by the Koch Engineering Company, Inc. Of Wichita, Kansas. In a laboratory test model of the system of the invention, "Flexirings" of a ⅝ inch nominal size and having a surface area of 100 sq. ft. per cu. ft. were used. In a prototype system of the invention having a 48 cu. ft. mixing zone volume, 3½ in. "Flexirings" providing 28 sq. ft. surface area per cu. ft. were effectively utilized. It will be recognized by those skilled in the art that other types of packing media such as Raschig and Pall rings and saddle (e.g., Berl) type packing may be used without departing from the teachings of the present invention. The fixed media 28 may also be composed of materials other than plastic as long as such are non-toxic to the microbes and otherwise are receptive to aerobic microbial growths. on their surfaces.

Another general type of fixed media that may be employed in the present invention is modular media, which is available in units of various sizes, and has a generally corrugated interior configuration. Such media is manufactured by the B. F. Goodrich Co. under the trade name "Vinyl Core" media and by the Ethyl Corporation under the trade name "Flocor." This modular media is available, for example, in 2ft. × 2ft. × 4ft. rectangular solid shapes.

When the media 28 comprises a multiplicity of individual elements, the bottom 24 of the mixing zone is a perforated floor having apertures which are not large enough to permit passage of the individual elements of the media 28, but should be as large as possible consistent with this limitation. In the event that modular media is employed, an apertured floor may be unnecessary, as the media itself forms a unitary mass.

As previously mentioned, a flow passageway means 26 occupies the center of the mixing zone and extends between the top 22 and the bottom 24 thereof. The flow passage 26, which may be in the form of a cylindrical conduit, forms part of a recirculation flow path including the fixed media 28 of the mixing zone. The flow passage 26 is conveniently located along the central axis of the housing 12 as illustrated although the passageway may be disposed in other locations within or even without the housing 12.

In accordance with the present invention, the fixed media 28 within the mixing zone is submerged in the liquor entering the system through the inlet conduit 14. Biological oxidation of the organic waste products within the liquor is achieved by continuous circulation of the liquor through the media and by continuous aeration of the liquor in a manner to encourage highly active aerobic microbial growth on the fixed media 28 throughout the volume of the mixing zone. It is an important aspect of the present invention that the bacterial growth adhere to the fixed media and that flocculent or suspended aerobic bacterial culture be minimized. In other words, excessive agitation or turbulence within the mixing zone causing bacterial growth to shear or break off the fixed media 28 is to be avoided.

It is also important to obtain effective utilization of the entire volume of the fixed media 28 and therefore the circulation system should be designed to promote homogeneous mixing and to preclude circulation voids or dead pockets within the mixing zone 28.

In accordance with the present invention, the suspended solids in the waste water attach themselves to slime on the fixed media 28. The solids remain on the media until they slough off as inert residual solids, thereby providing a long period for microbes to oxidize and stabilize the organic matter. The sludge age of the present method and system, i.e., the length of time the solids remain on the media before they are sloughed off, is much longer than in a normal activated sludge system. It is possible to approach the theoretical oxidation limit by the method and system of the present invention. It has also been found that the system has an excellent capacity for absorbing shock loads.

It has been found that the aerating, distributing and circulating functions can be accomplished in a highly efficient and satisfactory fashion by means of a mechanical surface aerator 30 installed at the top of the central flow passage 26. The aerator 30 preferably is of a design disclosed and claimed in pending application Ser. No. 75,515, filed Sept. 25, 1970 entitled "Mechanical Aerator," now U.S. Pat. No. 3,704,868, and assigned to the same assignee as the present invention. The aerator of the aforesaid patent draws the liquor upwardly through the flow passageway 26 and aerates the drawn liquor by means of rotating impeller blades which break the liquor into small particles while throwing the liquor radially outward in a substantially uniform distribution pattern over the top 22 of the mixing zone.

The mechanical surface aeration provided by the unit 30 creates less shear force and agitation within the volume of the mixing zone than other techniques such as diffused aeration. However, it is to be understood that other aeration techniques or other types of aerator units may be substituted for the unit 30 without departing from the present invention, as long as the earlier noted criteria are met. For example, an air pipe (not shown) may be disposed within the flow passageway 26 with its orifice opening downwardly at some intermediate point within the length of the passageway 26. In this arrangement a deflector cone is positioned at the top of the passageway 26 in the place of the aerator 30 to deflect the liquor displaced upwardly by the air discharged from the central tube.

In the present embodiment, the rotating impeller blades 30 of the mechanical aerator are driven by a motor assembly 32 supported on a bridge 35 which is affixed to opposite sidewalls of the housing 12. The motor assembly 32 and the impeller unit 30 are connected by a conventional driveshaft 34.

Typically, the rotor portion 30 of the aerator is mounted at the surface of the liquid with its blades partially submerged. In order to avoid possible interference with the media 28, a coarse retaining mesh may be positioned at the top 22 of the mixing zone. Additionally, it is preferable that the media 28 be of a specific gravity at least slightly greater than that of water so as to minimize interference with the impeller blades.

As those skilled in the act will appreciate, the present invention is well adopted to the treatment of liquor in an atmosphere of pure oxygen, which is advantageous primarily because of its high solubility as compared to air. For example, an atmosphere of pure oxygen can readily be provided above the media 28. Of course, it would be necessary to provide a cover on the housing 12 (not shown) together with suitable means for the delivery of oxygen.

In accordance with a preferred embodiment of the present invention, there is further provided within the housing 12 a sediment receiving zone. The receiving zone is positioned below the bottom 24 of the mixing zone. A conical receiving basin 38 encloses the lower end of the housing 12. The sidewalls of the conical basin 38 define an angle of approximately 60° with the vertical axis of the cone thereby assuring that sediment will flow toward the apex of the cone. A sludge draw-off pipe 40 opens into the conical apex of the basin 38. A valve 42 interposed along the length of the pipe 40 is periodically opened to draw-off collected sediment. Typically, the sediment is in the form of substantially inert, residual solids that have settled out of the mixing zone. The withdrawn sediment is not recirculated through the process but rather is disposed of in any convenient and conventional fashion.

The lower end of the flow conduit 26 terminates at the bottom 24 of the mixing zone. The apex of the receiving basin 38 is positioned sufficiently below the bottom 24 such that the recirculating liquor does not scour the bottom of the receiving basin and return sediment to the system. In this regard, the system is operated to maintain a high solids detention time on the fixed media 28. Solids entering the influent conduit 14 are removed along with the soluble contaminants by the microorganisms growing on the fixed media 28. Periodically, digested solids are released from the fixed media 28 to settle into the receiving basin 38. The digested solids, both non-biodegradable and microbial, have better settling properties than the influent solids because of their larger size and density which are a direct result of the high microbial detention time provided by the fixed media 28.

In some instances, the natural sloughing of solids from the media may be inadequate to remove sufficient accumulated solids from the media 28, so that clogging might occur. It is therefore sometimes desirable to provide means for periodically air-scouring the media 28. In this instance, such means comprise a pair of concentric annular air manifolds 44, which are simply ring-shaped pipes having holes in the top, and positioned below the media 28. The manifolds 44 are connected to a suitable source of pressurized air (not shown) through a connecting pipe 46. To accomplish the air scouring, waste water flow through the inlet conduit 14 is periodically interrupted, and compressed air is delivered into the annular manifold 44 and upwardly through the submerged media 28. After an adequate amount of solids has been removed from the media 28, the air flow is stopped, and collected solids are removed from the receiving basin 38 through the sludge draw-off pipe 40.

A laboratory scale study of the method and system of the present invention was conducted utilizing a model 40–100 "VIRTIS" constant temperature fermenter as the reactor unit. The reactor was operated at room temperature which ranged from 21°C. to 27°C. The reactor had a capacity of 10.5 liters without the fixed media 28, draft tube 26, apertured floor 24 and other submerged components. The effective liquid detention capacity of the reactor with the submerged components was 9.0 liters. The influent flow for a particular aeration time was based upon the effective detention capacity of the reactor, i.e., 9.0 liters.

The fixed media 28 used in the laboratory model was the polypropylene "Flexirings" previously described herein. A total of 1500 units of the laboratory size "Flexirings" ⅝ in. nominal size, were used. The average unit weight of dry media was found to be 0.5060 grams. The volume displaced by the 1500 units was approximately 900 ml. The described media are inert, do not deflect under normal loads and can be exposed to a maximum temperature of 260°F. with no detrimental effects. The ⅝ inch size media gave a surface area of 100 sq. ft. per cu. ft. The aforementioned media is per se conventional and has previously been used in trickling filter systems.

In the studies, settled sewage obtained from the processing plant of a small community was pumped to the modelized reactor unit by a model RRP pump manufactured by Fluid Metering, Inc. To maintain a uniform pumping rate, a conventional constant head device was interposed between the feed tank and the inlet side of the pump. The sewage was pumped to the biological reactor on a continuous basis and at a fixed rate to give the desired aeration time. Complete mixing and aeration were achieved by magnetically driven flat-bladed turbines positioned within the central draft tube 26.

Initially, the reactor unit was operated within a 12 hour aeration time for a period of 127 days. Studies were conducted for an additional 26 days with a 6 hour aeration time. During the 12 hour detention time, the average influent total chemical oxygen demand (COD) was found to be 202 mg/l, and the influent soluble COD was found to be 111 mg/l. The average effluent total COD was found to be 31 mg/l. Effluent total COD and soluble COD were essentially the same because of negligible suspended solids in the effluent.

During the 6 hour detention time, the average influent total COD was 508 mg/l, and the average influent soluble COD was 240 mg/l. The effluent total COD averaged 30 mg/l.

More limited studies were conducted with respect to the biological oxygen demand (BOD). During the term of the analysis, the influent total (BOD) averaged 98 mg/l and the soluble BOD averaged 53 mg/l. During the 6 hour detention time, the influent BOD averaged 174 mg/l while the soluble BOD averaged about 88 mg/l.

During the 12 hour detention time, the influent suspended solids ranged from 10 to 137 mg/l with an average of 65 mg/l. The effluent suspended solids usually ranged from 0 to 5 mg/l with an average of 3 mg/l. About 80% of the total suspended solids were volatile. During the 6 hour detention time, the influent suspended solids averaged 121 mg/l and effluent suspended solids an average of 14 mg/l.

It was also found that during the 12 hour detention time almost complete nitrification occurred with proper mixing and the presence of adequate dissolved oxygen. The pH was measured at regular intervals on the influent and effluent and ranged between 7.1 to 7.8. Occasionally, dissolved oxygen was measured on the mixed liquor in the draft tube. The dissolved oxygen ranged between 1.5 to 2.4 mg/l.

Microscopic examination of biological solids on the fixed media revealed that the microbes were identical to those found in the normal activated sludge system. During the 12 hour detention time higher forms of animal life existed in the biological solids on the fixed media than during the 6 hour study.

Throughout the study, the system produced an extremely good quality of effluent in terms of the percent of removal and the effluent concentration of COD, BOD, and suspended solids. During the 12 hour detention time, the system was able to remove 85 percent total COD, 95 percent BOD and 95 percent total suspended solids. During the 6 hour detention time the system removed 85 percent COD, 86 percent BOD and 88 percent suspended solids.

While particular embodiments of the present invention have been shown and described, it is apparent that various changes and modifications may be made, and it is therefore intended in the following claims to cover all such modifications and changes as may fall within the true spirit and scope of this invention.

I claim:
1. A method for treating a liquor containing biodegradable waste products comprising:
   introducing said liquor into a single column of submerged fixed media material said media providing a multiplicity of flow paths and having a surface area to volume ratio of at least 20 ft.$^2$ per cubic foot and a volumetric void space of at least 85%;
   simultaneously surface aerating said liquor at the top of said media column and distributing the aerated liquor over the top of said media column to cause said liquor to flow downwardly through said media column and to be split into a multiplicity of individual streams to promote intimate contact of said liquor with said media and to control and maintain turbulence below a level disruptive to microbial growth on said media while providing sufficient oxygen for microbial growth on said media;
   passing said liquor from the bottom of said column to a receiving basin positioned directly below said column;
   returning said liquor from said receiving basin to the top of said media column through a flow passageway isolated from said column;
   recirculating said liquor through said aerating and distributing steps to repeatedly pass said liquor through said media column;
   removing effluent which has passed through said media column;
   collecting residual solids in a sediment receiving zone in a lower portion of said receiving basin and spaced substantially below the flow path through said fixed media to a preclude resuspension of said solids;
   and removing said solids from said sediment receiving zone.
2. The method as defined in claim 1 wherein said fixed media material comprises a multiplicity of individual elements freely and randomly stacked on one another.
3. The method as defined in claim 1 wherein said fixed media material comprises at least one modular unit of media material.
4. The method as defined in claim 1 further comprising the step of periodically airscouring said fixed media by passing air upwardly therethrough.
5. The method as defined in claim 1 wherein said effluent is drawn off at a point intermediate between the top and bottom of said fixed media column.
6. A method for treating a liquor containing biodegradable waste products comprising:
   introducing said liquor into a single column of submerged, plastic fixed media material, said media providing a multiplicity of flow paths and having a surface area to volume ratio of at least 27ft.$^2$ per cubic foot and a volumetric void space of at least 90%;

simultaneously surface aerating said liquor at the top of said media column and distributing the aerated liquor over the top of said media column to cause said liquor to flow downwardly through said media column and to be split into a multiplicity of individual streams to promote intimate contact of said liquor with said media and to control and maintain turbulence below a level disruptive to microbial growth on said media while providing sufficient oxygen for microbial growth on said media;

returning said liquor from the bottom to the top of said column through a central flow passageway isolated from said column;

recirculating said liquor through said aerating and distributing steps to repeatedly pass said liquor through said media column;

removing effluent which has passed through said media column;

collecting residual solids in a sediment receiving zone positioned directly below said media column and spaced substantially below the flow path through said fixed media to preclude resuspension of solids; and periodically removing solids from said sediment-receiving zone.

7. The method as defined in claim 6 wherein said fixed media material comprises a multiplicity of individual elements freely and randomly stacked on one another.

8. The method as defined in claim 6 wherein said fixed media material comprises at least one modular unit of media material.

9. The method as defined in claim 6 further comprising the step of periodically airscouring said fixed media prior to removing said solids from said sediment-receiving zone by passing air upwardly through said media.

10. A reactor system for treating a liquor comprised of biologically degradable waste products to yield a clarified effluent, comprising:

reactor means comprising a container having a mixing zone with a top and bottom capable of passing liquid flow, and said container having an inlet for introducing said liquor into said container in a quantity to submerge said mixing zone and an outlet for drawing off clarified effluent from said container;

fixed media means occupying the volume of said mixing zone and comprising a material having a surface area to volume ratio of at least 20 ft.$^2$ per cubic foot, a volumetric void space of at least 85%, a low impedance to liquid flow, and a surface condition receptive to aerobic microbial growth;

flow passageway means extending between the top and bottom of said mixing zone;

circulating means for pumping said liquor in a recirculation flow path from top to bottom of said mixing zone and returning through said flow passageway means, said circulating means including aerator and distributor means for aerating said liquor outside of said mixing zone and for distributing said aerated liquor uniformly over the top of said mixing zone, said circulating means being further constructed and arranged for promoting homogenous mixing of said aerated liquor thorughout said mixing zone to encourage aerobic microbial growth on said fixed media while minimizing agitation in said mixing zone of a kind tending to dislodge aerobic microbial growth from said fixed media and develop flocculent aerobic microbes; and a receiving basin located directly below the base of said fixed media and defining a sediment receiving zone and having a basin outlet for periodically drawing off sediment collected in said basin.

11. The system of claim 10 in which said circulating means comprises a mechanical surface aerator positioned adjacent the top of said mixing zone and communicating with said flow passageway means.

12. The system of claim 11 in which said outlet of said container opens into said mixing zone at a position intermediate the top and bottom thereof.

13. The system of claim 11 in which said fixed media comprises a plastic material composed of a multiplicity of individual elements freely and randomly stacked on one another, and wherein the bottom of said mixing zone comprises a perforated floor.

14. The system of claim 11 wherein said fixed media comprises at least one modular unit of media material.

15. The system of claim 11 further comprises means below said fixed media for delivery of air upwardly through said fixed media.

* * * * *